June 9, 1925.                                                    1,541,604
W. WAGNER
ELECTRICALLY OPERATED MEANS FOR SEALING VACUUM BOTTLES IN COMBINATION
WITH AUTOMATIC PLUG FEEDING MECHANISM
Filed May 29, 1923          2 Sheets-Sheet 1
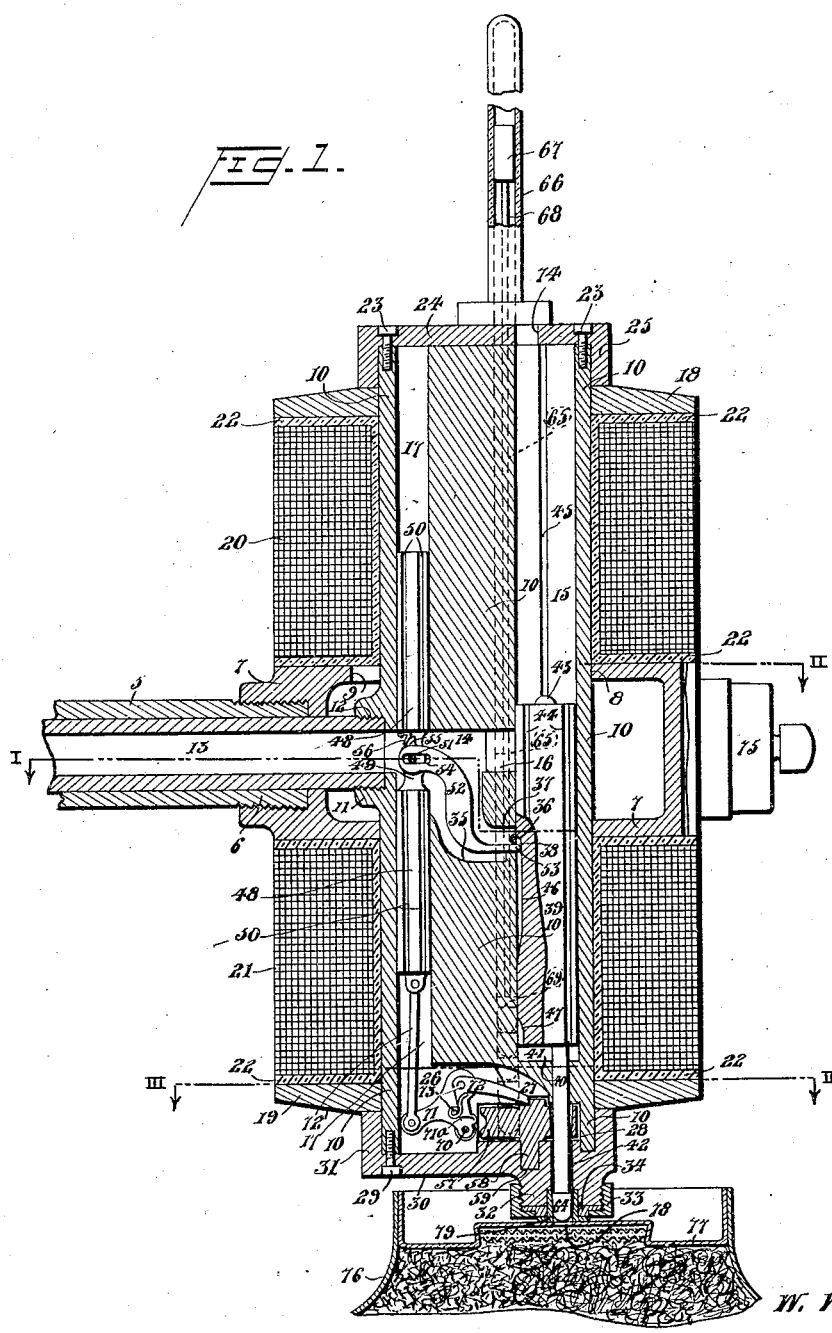
Inventor
W. Wagner
By
Attorney June 9, 1925.
W. WAGNER
1,541,604
ELECTRICALLY OPERATED MEANS FOR SEALING VACUUM BOTTLES IN COMBINATION
WITH AUTOMATIC PLUG FEEDING MECHANISM
Filed May 29, 1923   2 Sheets-Sheet 2
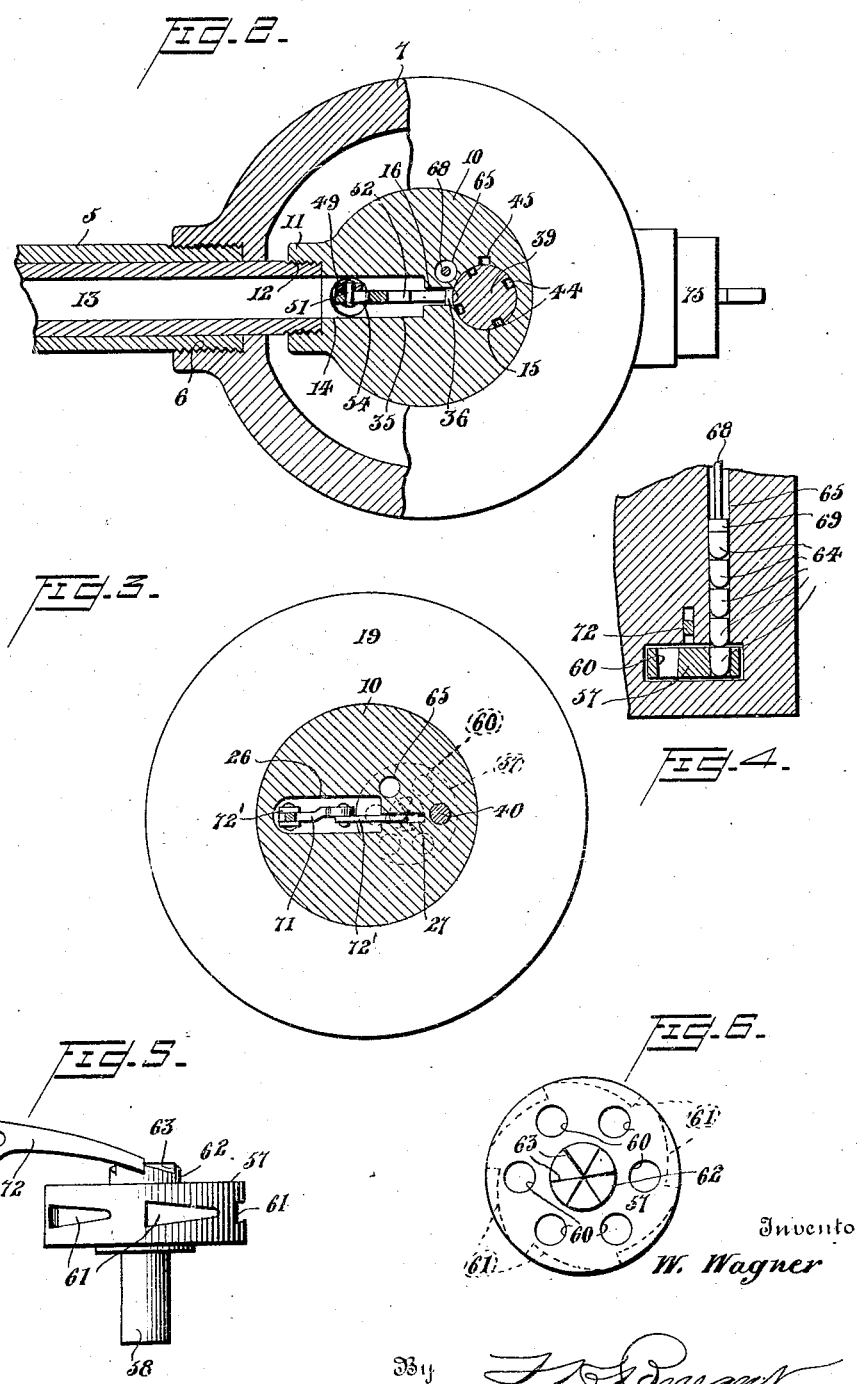
Inventor
W. Wagner
By F. H. Bryant
Attorney Patented June 9, 1925.

1,541,604

UNITED STATES PATENT OFFICE.

WALTER WAGNER, OF CHICAGO, ILLINOIS.

ELECTRICALLY-OPERATED MEANS FOR SEALING VACUUM BOTTLES IN COMBINATION WITH AUTOMATIC PLUG-FEEDING MECHANISM.

Application filed May 29, 1923. Serial No. 642,322.

*To all whom it may concern:*

Be it known that I, WALTER WAGNER, a citizen of Poland, residing at Chicago, in the county of Cook and State of Illinois, have invented certain new and useful Improvements in Electrically-Operated Means for Sealing Vacuum Bottles in Combination with Automatic Plug-Feeding Mechanism, of which the following is a specification.

This invention is an electric vacuum sealing apparatus combined with automatic means for feeding the sealing elements employed.

In accordance with the present method of manufacturing carafes or other similar vessels, substantially the final steps performed are the exhausting of air or other gaseous substance from the vacuous chamber and the sealing of the opening through which such air is evacuated. In the manufacture of metal carafes wherein a plurality of metal shells are employed, it is the present custom to seal the exhaust opening by a soldering or welding process which is performed while the vacuum is maintained. This method was undoubtedly satisfactory for the first stages of development of the metal carafe, but has been found inadequate for the present more advanced development. It has been discovered and developed that by filling the vacuous space or chamber of the vessels with a finely divided material, a high degree of heat insulation may be obtained at a much less reduced gaseous pressure in the said vacuous space.

During my experiments along these most recent lines of development, I have found that it is practically impossible to prevent the collection of a fine dust upon the surface to be soldered which apparently is due to the use of the finely divided material referred to above. This collection of dust makes sealing of the air discharge opening by a soldering operation very unsatisfactory and impractical. In my pending applications Serial No. 546,047, filed March 23, 1922, Serial No. 592,666, filed October 5, 1922, and Serial No. 592,667 filed October 5, 1922, I have relied upon the use of a plug or check valve for sealing the air discharge opening of the vacuous chamber and have found this method very satisfactory.

It is, therefore, the primary object of this invention to provide an apparatus capable of sealing the exhaust opening of carafes or other vacuous vessels while the vacuum is maintained therein.

A further object of the invention is to provide an apparatus which will accomplish the sealing operation referred to above by inserting or driving a plugging element into the said opening.

A further object of the invention is to provide suitable mechanism for automatically feeding said plugging element into a proper position for being driven into the opening formed in said vacuous chambers.

A still further object of the invention is to provide electrical means for accomplishing the driving and automatic feeding of the plugging elements while the vacuum is maintained in the exhausted chamber.

Other objects and advantages of the invention will be apparent during the course of the following description.

In the accompanying drawings forming a part of this specification and in which like numerals are employed to designate like parts throughout the same, Figure 1 is a vertical sectional view, partly in elevation, of the apparatus embodying this invention and shows a fragmentary portion of a carafe or other form of vacuum bottle being sealed by the plugging portion of the apparatus, Figure 2 is a horizontal sectional view taken on lines II—II of Fig. 1, Figure 3 is a horizontal sectional view taken on lines III—III of Fig. 1, Figure 4 is a fragmentary sectional view showing a portion of the plug storage chamber and the feeding disk employed for conveying the said plugs from this chamber to a proper position in alinement with the plug driving portion of the apparatus, Figure 5 is an elevational detail view of the plug carrying or feeding disk with a portion of the mechanism employed for rotating this feeding element, and Figure 6 is a detail plan view of the said plug feeding disk.

In the drawings, wherein for the purpose of illustration is shown a preferred embodiment of this invention, the numeral 5 designates a tubular supporting element having threadedly connected to its outer end 6 a supporting shell member 7 which is provided with a substantially centrally positioned opening 8 formed therein. There is further provided a cut-out portion 9 formed in the upper face of the shell 7 and communicating with the opening 8 for the purpose of allowing the disassembling of a member secured to this collar and which will be described at a later point. Suitably secured to the shell 7 and positioned within its opening 8 is a cylindrically-shaped substantially solid member 10 which is provided with a boss portion 11 projecting laterally therefrom which is provided with an internally threaded bore 12 which connects with a pipe 13 extending longitudinally through the tubular member 5 as shown. This pipe 13 is suitably connected to a vacuum pump, not shown. The provision of the cutout portion 9 in the shell member 7 is provided for allowing the boss 11 formed integrally with this cylindrically-shaped brass member 10 to be moved upwardly therethrough for separating the brass member 10 from the shell 7.

The brass cylinder 10 is provided with a chamber 14 which communicates with the bore if the pipe 13 and with a longitudinally extending cylindrically-shaped chamber 15 by means of the passage way 16. There is further provided a longitudinally extending cylindrically-shaped chamber 17 which is eccentrically formed within the said member 10 and communicates or is intersected by the aforementioned chamber 14. Encircling the brass cylinder 10 and positioned in proximity to its opposite ends are upper and lower removable cap members 18 and 19 respectively which are employed for coacting with the upper and lower surfaces of the shell 7 for providing cases or frames to receive the upper and lower solenoid coils 20 and 21 in the manner best illustrated in Fig. 1. There are provided suitable insulating elements 22 for protecting the wires of said coils from the shell 7, brass cylinder 10, and caps 18 and 19. Removably secured, as by the screws 23, to the upper end of the brass cylinder 10 is a plate member 24 which is provided with an angularly arranged flange 25 which encircles the said cylinder 10 and engages the upper face of the top cap 18 for suitably locking the coil 20 in position against the shell 7. The lower end of the brass cylinder 10 is provided with a recess or chamber 26 having a relatively narrow opening 27 which extends laterally from the said chamber 26 and communicates with a horizontally positioned circular opening 28 which is positioned substantially below the longitudinally extending chamber 15. Suitably secured to the extreme lower end of the brass cylinder 10, as by means of the screw 29 is a plate 30 which is provided with an annular flange 31 extending angularly therefrom for encircling the lower end of the brass cylinder 10 and for engaging the lower face of the cap 19 to retain the lower coil 21 in position as shown. This plate 30 is provided with a tubular extension or boss 32 which is externally screw threaded for removably receiving the clamping nut 33 which is provided for retaining the rubber gasket 34 in the position shown. The chamber 14 described heretofore is provided with an arcuately formed extension or passage 35 which communicates with the chamber 15 at a point below the passage 16, there being provided a horizontally positioned bar 36 which is provided with a semi-circular longitudinally extending rear face as shown. This bar 36 bridges the extreme outer end of the arcuate extension or passage 35 for the purpose of forming upper and lower holes 37 and 38 respectively in the wall of the chamber 15.

Slidably positioned within the chamber 15 is a steel plunger or armature 39 which is provided with a reduced extension 40 depending from its lower end and adapted for being inserted through an aperture 41 which forms a communication between the lower end of the chamber 15 and the circular chamber 28. This aperture 41 is in vertical alinement with the bore 42 formed in the plate 30 and tubular boss or extension 32. This plunger or armature 39 is provided with a rubber bumper 43 which is secured to the upper end of the same and is provided for acting as a shock absorber when the plunger is moved upwardly within the chamber 15 and strikes against the plate 24 which is secured to the upper end of the brass cylinder 10. The plunger is further provided with a series of longitudinally extending grooves 44 which allow the passage of air past the same while it is moving upwardly or downwardly within the chamber 15. The wall of the chamber 15 is provided with a longitudinally extending groove 45 which acts as a guide for the plunger or armature 39 and is engaged by a pin or suitable projection, not shown, which forms a part of the said plunger. The provision of this guiding groove and projection or pin prevents a rotary movement of the said plunger which would throw the reduced projection 40 out of alinement with the aperture 41 and bore 42. The outer face of this plunger or armature 39 is also provided with a longitudinally extending groove 46 which alines with the upper and lower openings 37 and 38 formed in the wall of the chamber 15. There is also provided at the lower end of this plunger 39 a relatively small groove 47 which longitudinally alines with the larger groove 46. The function of the grooves 46 and 47 will be described at a later point.

Slidably mounted within the chamber 17 formed in the brass cylinder 10 is a dual plunger having upper and lower parts 48 which are connected at their mean ends by a flat bridge piece 49. These upper and lower parts 48 are provided with longitudinally extending grooves 50 formed in their outer surfaces for allowing air to pass by the same when they move upwardly and downwardly within the said chamber 17 thereby preventing the pocketing of air either above or below the same. Pivotally and slidably connected to this bridge piece 49, as by the rivet or pivot pin 51 is a timer arm 52 which is of reverse curve formation having a reduced outer end 53 which is adapted for alternately occupying first the upper and then the lower openings 37 and 38 respectively formed in the wall of the plunger chamber 15. It will be seen that the slot 54 formed in the inner or larger end of this timing arm 52 will allow the said arm to pivot as well as slide upon the pin 51. There is further provided at this larger end of the timer arm 52 a relatively small lug 55 which is adapted for engaging a spring element 56 which is carried by the lower end of the upper dual plunger 48. This spring 56 is adapted for retaining the timer arm 52 moved forwardly in respect to the bridge piece 49 for retaining the smaller end 52 of the said timer arm normally in position within either the upper or lower opening 37 or 38 formed in the plunger chamber 15.

Referring particularly to Figs. 1 and 3 to 6 inclusive there is shown a disk 57 which is provided with a bearing spindle 58 adapted for being rotatably mounted within a recess 59 formed in the removable plate 30 which is secured to the lower end of the brass cylinder 10. This disk 57 is provided with a series of openings 60 which are provided with tapered walls as best illustrated in Fig. 4. Formed in the peripheral face of the disk 57 are a series of notches 61 which are provided for a purpose to be described at a later point. Axially alining with the bearing spindle 58 and projecting upwardly from the top face of the disk 57 is a boss 62 that is provided with a series of teeth 63 as best shown in Figs. 5 and 6. This disk 57, which I will term a feeding disk, is supplied with plugs 64 which are delivered within the series of openings 60 from a longitudinally extending plug carrying chamber 65 which is shown in dotted lines in Fig. 1 extending parallel with the plunger chamber 15 and further shown in cross-section in Figs. 2 to 4 inclusive. Secured to the top plate 24 is a perpendicularly extending glass tube 66 having a bore that vertically alines with the said chamber 65 and is adapted for receiving the head 67 of a plug feeding rod 68 which is provided with an enlarged portion 69 at its lower end that engages the uppermost rubber plug 64 positioned within the chamber 65. It is intended that this member 68 with its weighted head 67 will feed the plugs 64 into the openings 60 formed in the feeding disk 57 as the said openings 60 are consecutively brought into vertical alinement with the lower end of the said chamber 65. The glass tube 66 shown partially broken away in Fig. 1 is supposed to be of sufficient length to house the entire plug feeding element 68. The gradual feeding of the plugs 64 from the chamber 65 will cause the weighted head 67 carried by the feeding element 68 to gradually drop downwardly within this tube 66 and will therefore form a sight indicating means for determining generally the number of plugs within the said chamber 65.

Pivotally mounted within the chamber 26 upon the fulcrum pin 70 is a lever 71 which is operatively connected with the lower end of the lower dual plunger 48 by means of a link 72' as best shown in Fig. 1. The lever 71 is provided with a pawl 72 that is pivotally connected thereto and adapted for engaging the teeth 63 carried by the plug feeding disk 57 for the purpose of rotating the said disk to bring the next consecutive opening 60 in vertical alinement with the path of travel of the extension 40 carried by the lower end of the plunger or armature 39. There is further provided a spring element 73 that is secured to the lever 71 for the purpose of retaining the outer end of the pawl 72 in engagement with the said teeth 63.

For the purpose of recording the degree of vacuum created by the pump attached to the pipe 13, there is provided an opening 74 in the upper plate 24 that communicates with the upper end of the plunger chamber 15 for the purpose of allowing a pressure gage, not shown, to be mounted therein. A three-way switch 75 is suitably mounted upon the shell 7 and is properly connected with the upper and lower solenoid coils 20 and 21 in such a manner as to allow the said coils to be selectively supplied with current from any suitable source.

In the showing of a carafe or vacuum bottle designated by the numeral 76 there is provided a bottom plate or cap 77 which is adapted for being secured to the extreme lower end of the outer wall of the said vessel and is provided with a centrally positioned opening 78 which alines with the bore of a nipple 79 attached to said plate or cap 77. This nipple 79 is positioned within a suitable opening formed in the rubber gasket 34 and tubular boss or extension 32 carried by and formed with the lower plate 30 respectively for the purpose of allowing the air to be exhausted from the vacuous chamber formed in the said carafe and for further receiving a plug 64 within the said nipple after the vacuum has been created. Any suitable means, not shown, may be provided for supporting the carafe or vacuum bottle 76 in the position shown in Fig. 1.

The operation of this apparatus is as follows:—

Prior to the connecting of a carafe or other vacuum vessel to the apparatus embodying this invention, the upper and lower solenoid coils 20 and 21 are energized successively for causing the dual plungers 48 to be reciprocated within the chamber 17 for the purpose of causing rotation of the feeding disk 57 to allow for the positioning of the plugs 64 within the series of openings 60. This energizing of the coils 20 and 21 will also cause the plunger or armature 39 to be reciprocated within the chamber 15 for causing the extension 40 to be inserted through the openings 60 formed in the disk 57 as they are consecutively brought into vertical alinement with the said extension. When this extension 40 starts to force the plugs 64 through the bore formed in the boss or extension 32, the feeding disk 57 has been properly filled with plugs. The machine is then in readiness for the positioning of a carafe in engagement therewith in a manner shown in Fig. 1.

The plunger or armature 39, dual plungers 48, timer arm 52, and the disk 57 with its rotating mechanism are all in the positions as shown in Fig. 1. The electric switch 75 is then actuated for connecting the upper solenoid coil 20 with a source of electricity. This energizing of the upper coil will cause the plunger or armature 39 to be moved upwardly within the chamber 15. The dual plungers 48 will at the same time be influenced by the upper solenoid coil 20, but due to the outer reduced end 53 of the timer arm 52 being in engagement with the lower opening 38 formed in the plunger chamber 15, and the extension 40 carried by the said plunger being inserted through an opening 60 formed in the feeding disk 57 thereby holding the latter stationary, the said dual plungers will not be permitted to move upwardly until the feeding or driving plunger 39 has moved a sufficient distance to cause the end 53 of the timer arm to be disengaged from the groove 46 formed in the said driver plunger and the removal of the extension 40 from the plug feeding disk 57. The removal of the end 53 carried by the timer arm 52 from the groove 46 will allow the said end to be drawn around the semi-circular inner face of the bar 36 to allow the said end to aline with the upper opening 37 formed in the wall of the chamber 15. After the lower end of the feeding plunger 39 has passed this upper opening 37, the end 53 of the timer arm will be allowed to project outwardly through the same and will be moved in its forward direction by means of the spring elements 56 engaging the lug 55 carried by the fulcrum end of this arm. This upward movement of the dual plungers 48 will cause the lever 71 to fulcrum upon the pin 70 for moving the pawl 72 forwardly a sufficient distance for engaging the proper tooth 63 carried by the disk 57 thereby moving the next consecutive opening 60 with its plug in alinement with the path of travel of the extension 40. The semi-circular projection 71$^a$ carried by the lever 71 will engage one of the notches 61 formed in the peripheral surface of this disk 57 for the purpose of preventing the disk from being rotated more than is necessary to bring the next consecutive opening 60 and plug 64 in its proper position.

While the driver plunger 39 is retained in its upper position by the solenoid coil 20 and the dual plungers 48 are in their operative positions as described, the vaccum pump is started or connected with the pipe 13 for exhausting the air from the vacuous chamber formed in the carafe 76. After a sufficient degree of vacuum has been created in the said vacuous chamber, the current is turned off of the upper solenoid coil 20 and connected with the lower solenoid coil 21 for the purpose of urging the driving plunger downwardly with sufficient force to drive the plug 64 from the opening 60 formed in the feeding disk 57 and into the nipple 79 carried by the bottom of the said carafe. The downward movement of this driving plunger 39 will cause the outer end 53 of the timer arm 52 to first engage or occupy the groove 47 formed in the lower end of the said plunger 39 and then to be forced inwardly by the portion of the plunger positioned between the said grooves 46 and 47 for causing the said timer arm to move inwardly and to disengage the end 53 from the upper opening 37. The lower solenoid coil 21 may then draw the dual plunger 48 downwardly to cause the plug feeding disk actuating elements to be returned to their inoperative positions and for allowing the timer arm 52 to position its outer end 53 within the lower opening 38 formed in the plunger chamber 15. The carafe has then been properly sealed and may be removed from the apparatus. Current is then passed into the upper solenoid coil 20 and the various elements are actuated in the manner described above.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, I claim:—

1. An apparatus for the purpose described, comprising a connection for the air discharge opening of a vacuous chamber to enable a vacuum to be created therewithin, means for automatically feeding sealing elements into a proper position for being inserted into said opening, and means for driving one of said elements into said opening while the vacuum is maintained.

2. An apparatus for the purpose described, comprising a connection for the air discharge opening of a vacuous chamber to enable a vacuum to be created therein, means for automatically feeding sealing elements into a proper position for being inserted into said opening and reciprocating means for driving one of said elements into said opening while the vacuum is maintained.

3. An apparatus for the purpose described, comprising a connection for the air discharge opening of a vacuous chamber to enable a vacuum to be created therewithin, means for automatically feeding sealing elements into a proper position for being inserted into said opening, and means for reciprocating a driving element for the purpose of inserting a sealing element into said opening while the vacuum is maintained.

4. An apparatus for the purpose described, comprising a connection for the air discharge opening of a vacuous chamber to enable a vacuum to be created therewithin, means for feeding sealing elements into a proper position for being inserted into said opening, means for driving one of said elements into said opening while the vacuum is maintained, and means associated with said feeding and driving means for timing the feeding of said elements to correspond with the movement of said driving means.

5. An apparatus for the purpose described, comprising a connection for the air discharge opening of a vacuous chamber to enable a vacuum to be created therewithin, means for electrically operating a sealing element feeding means and a sealing element driving means, and means associated with said feeding and driving means for timing the feeding of said elements to correspond with the movement of said driving means.

6. An apparatus for the purpose described, comprising a connection for the air discharge opening of a vacuous chamber to enable a vacuum to be created therewithin, a storage chamber for sealing elements, means for conveying said elements into a proper position for being driven into said opening, means for operating said conveying means, means for driving one of said elements into said opening while a vacuum is maintained, and means associated with said conveyor operating means and said driving means for timing the feeding of said elements to correspond with the movement of said driving means.

7. An apparatus for the purpose described, comprising a connection for the air discharge opening of a vacuous chamber to enable a vacuum to be created therewithin, a storage chamber for sealing element, means for conveying said elements into a proper position for being driven into said opening, electrically actuated means for operating said conveying means, and electrically actuated means for driving one of said elements into said opening while the vacuum is maintained.

8. An apparatus for the purpose described, comprising a connection for the air discharge opening of a vacuous chamber to enable a vacuum to be created therewithin, electrically actuated means for operating said conveying means, electrically actuated means for driving one of said elements into said opening while the vacuum is maintained, and mechanically operated means associated with said conveyor operating means and said driving means for timing the feeding of said elements to correspond with the movement of said driving means.

9. An apparatus for the purpose described, comprising a connection for the air discharge opening of a vacuous chamber to enable a vacuum to be created therewithin, means for automatically feeding sealing elements into a proper position for being inserted into said opening, and a reciprocating plunger for driving one of said elements into said opening while the vacuum is maintained.

10. An apparatus for the purpose described, comprising a connection for the air discharge opening of a vacuous chamber to enable a vacuum to be created therewithin, a storage chamber for sealing elements, a rotary means for conveying said elements into a proper position for being driven into said opening, a reciprocating means for rotating said conveying means, a reciprocating means for driving one of said elements into said opening while the vacuum is maintained, and electric means for actuating the said reciprocating means.

11. An apparatus for the purpose described, comprising a connection for the air discharge opening of a vacuous chamber to enable a vacuum to be created therewithin, a storage chamber for sealing elements, a rotary means for conveying said elements into a proper position for being driven into said opening, a lever having a pawl member for engaging said rotary conveying means for operating the same, a reciprocating plunger connected to said lever, a reciprocating plunger for removing said sealing elements from said rotary means for inserting the same into said opening, and means for reciprocating said plungers.

12. An apparatus for the purpose described, comprising a connection for the air discharge opening of a vacuous chamber to enable a vacuum to be created therewithin, a storage chamber for sealing elements, a rotary means for conveying said elements into a proper position for being driven into said opening, a lever having a pawl adapted for engaging said rotary means for actuating the latter, a reciprocating plunger connected to said lever, a reciprocating plunger for removing said elements from said rotary means for driving the elements into said opening, and a pair of spaced solenoid coils for reciprocating said plungers.

13. An apparatus for the purpose described, comprising a connection for the air discharge opening of a vacuous chamber to enable a vacuum to be created therewithin, a storage chamber for sealing elements, a rotary means for conveying said elements into a proper position for being driven into said opening, a lever having a pawl member engaging said rotary means for actuating the same, a reciprocating plunger connected to said lever, a reciprocating plunger for removing said elements from said rotary means for inserting one element into said opening, means for reciprocating said plungers, and means for timing the movement of the lever and pawl for actuating the rotary conveying means to correspond with the movement of said driving means.

In testimony whereof I affix my signature.

WALTER WAGNER.